United States Patent [19]

Harvey

[11] Patent Number: 4,743,109
[45] Date of Patent: May 10, 1988

[54] SLIDE PROJECTOR WITH AUTOMATIC SLIDE WARPAGE COMPENSATION

[75] Inventor: Donald M. Harvey, Webster, N.Y.

[73] Assignee: Eastman Kodak Company, Rochester, N.Y.

[21] Appl. No.: 92,989

[22] Filed: Sep. 4, 1987

[51] Int. Cl.[4] .............................................. G01B 3/00
[52] U.S. Cl. ...................................... 353/101; 353/69
[58] Field of Search .................. 353/101, 69; 352/140; 350/255

[56] References Cited

U.S. PATENT DOCUMENTS 2,947,215  8/1960  Mitchell .
3,198,065  8/1965  Bohm .
3,416,859  12/1968  Badalich .
3,606,530  9/1971  Hennessy .
3,628,857  12/1971  Harvey .
3,639,048  2/1972  Heaney et al. .

*Primary Examiner*—Harry N. Haroian
*Attorney, Agent, or Firm*—Jeffrey L. Brandt

[57] ABSTRACT

A transparency projector includes a support for supporting a transparency generally in a plane, the transparency typically exhibiting a warpage such that its center is displaced from the plane by a pop distance. Means are provided for measuring the pop distance. Means are further provided for projecting light through the transparency, and for focusing the light projected through the transparency onto a viewing plane. These last recited means include a lens having a preselected f-number. A variable aperture is provided, responsive to the pop distance, for increasing the f-number of the lens when the transparency exhibits warpage.

12 Claims, 2 Drawing Sheets

SLIDE PROJECTOR WITH AUTOMATIC SLIDE WARPAGE COMPENSATION

This invention relates generally to transparency projectors and more specifically to a transparency projector adapted to vary the F-stop of a projection lens so as to keep buckled, popped, or otherwise warped transparencies in clear focus.

BACKGROUND OF THE INVENTION

A recognized problem in the art of projecting photographic transparencies onto a viewing screen is that of a loss of focus caused by a transparency popping, buckling, or otherwise warping from heat deformation. In a typical projector, the distance between the transparency and the projection lens is varied so as to focus the projection of the transparency on the viewing screen. This focusing is normally done when the transparency is first introduced into the projector. However, as the slide absorbs the heat from a projection lamp, it warps or buckles, changing the distance to the projection lens and thus defocusing the projection on the screen.

Several methods of partially correcting the focus of the projection onto the viewing screen are currently known. In manually focussed projectors, the operator simply readjusts the distance between the center of the transparency and the projection lens (i.e. refocuses the projector) so that the center of the projection is in focus.

U.S. Pat. No. 3,628,857 to Harvey (assigned to the same assignee and issued to the same inventor as the present invention) shows an autofocus transparency projector wherein apparatus is included for automatically measuring the distance to the viewing screen, and for automatically measuring and adjusting the distance between the transparency and the projection lens. The distance between the transparency and the projection lens is constantly monitored and adjusted so as to maintain the center of the transparency in focus on the viewing screen.

U.S. Pat. No. 2,947,215 to Mitchell shows a projector which compensates for popping of a transparency by shifting a glass wedge so as to vary a focal plane of a projection lens. This varying of the focal plane functions to refocus the center of the transparency on the viewing screen.

All of the above-described apparatus for focusing popped or warped transparencies fall short of the optimum, desired perforamnce because they only correct the focus of the center of the popped transparency. A human operator manually refocussing a projector to correct for a popped transparency will inherently focus on the transparency center. The automatic projectors as shown in Harvey and Mitchell include apparatus for automatically refocussing the centers of the popped slides. Because of the high f-stops of the projection lenses used in these projectors, the depth of field of the projection is small and the edges of the popped transparencies remain out of focus. This small depth-of-field prevents the proper focus of all regions of a popped transparency. Even if an attempt was made to refocus on a region other than the center, some region of the transparency would remain out of focus.

U.S. Pat. No. 3,416,859 to Badalich shows a transparency projector wherein slide warpage is prevented by direct mechanial pressure between a glass lens and a transparency. Such an arrangement suffers, however, from a variety of disadvantages inherent in the operation of hot, touching surfaces. These disadvantages include marring of the slide, possible heat damage to the slide, and sticking between the slide and the glass lens.

OBJECTS OF THE INVENTION

A principal object of the present invention is to provide a new and improved transparency projector which projects the entirety of a popped transparency in proper focus.

Another object of the present invention is to provide a transparency projector which automatically compensates for transparency popping so as to project the entirety of a popped transparency in proper focus.

A further object of the present invention is to provide a method for focusing a projector so as to project the entirety of a popped transparency in proper focus.

SUMMARY OF THE INVENTION

A new and improved transparency projector is provided which projects popped or otherwise warped transparencies in proper focus. The projector includes means for supporting a transparency generally in a plane, the transparency typically exhibiting a warpage such that the center of said transparency is displaced from the plane by a pop distance. Means are provided for measuring the pop distance. Means are provided for projecting light through the transparency. Means are further provided, including a lens having a preselected f-number, for focusing the light projected through the transparency onto a viewing plane. Variable aperture means are provided, responsive to the pop distance, for varying the effective f-number of the lens so as to improve the focus of the transparency at the viewing plane. In normal operation, focus is improved by increasing the f-number of the lens as the pop distance increases.

A method of focusing a transparency projector in accordance with the present invention is practised, for example using a projector as described above, by measuring the pop distance. The effective f-stop of the projection lens is then varied to improve the focus of the transparency at the viewing plane.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DETAILED DESCRIPTION OF THE PREFERRED EMBODIMENT OF THE INVENTION

Figure 1:
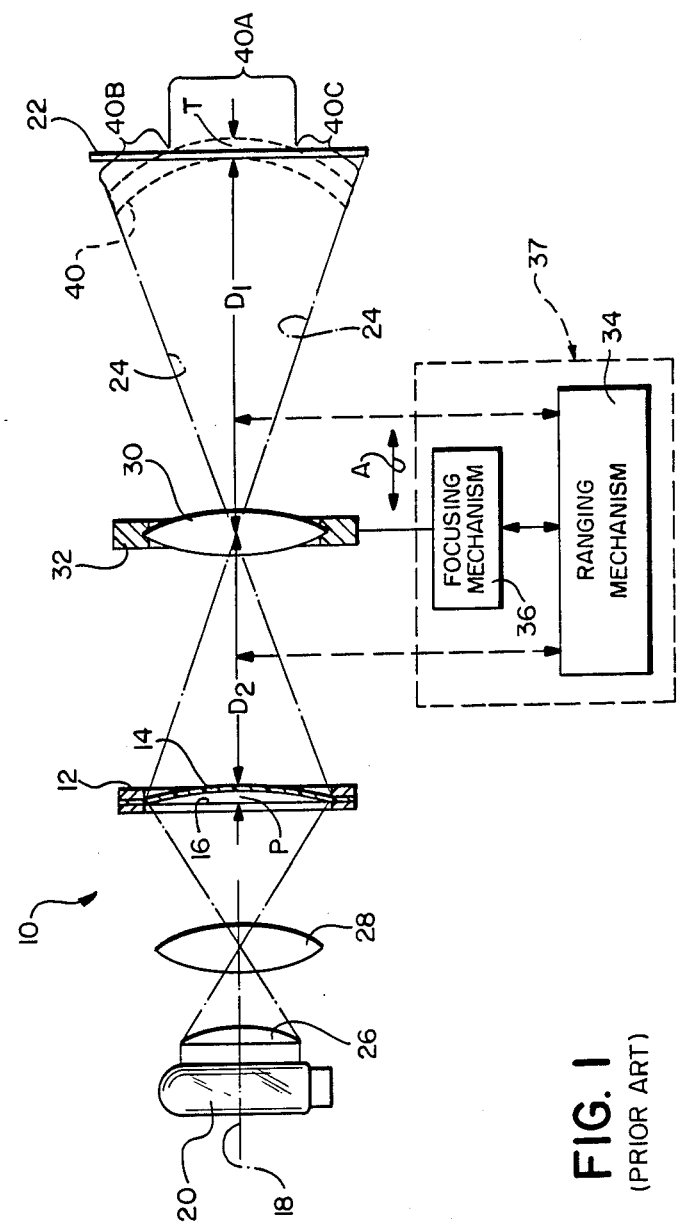
FIG. 1 is a diagrammatic view of a projector constructed in accordance with the prior art.

Referring now to FIG. 1, a projector 10 is shown constructed in accordance with the prior art. Projector 10 includes a gate mechanism 12 for supporting a photographic slide, or transparency 14, substantially in a plane 16 and centered on a projection axis 18. Transparency 14, initially entered into projector 10 in a flat state, is shown exhibiting a subsequently acquired heat deformation, typically referred to as buckling or popping, and visible as a deviation between the actual position of the center of the transparency and its desired position in plane 16. This deviation, indicated in FIG. 1 at P, will be referred to herein as the "pop" distance.

Projector 10 further includes a lamp 20 for projecting light through transparency 14 and onto a viewing screen 22. The path of this projected light is generally indicated by dashed-lines 24. Intermediate lamp 20 and transparency 14, and centered on projection axis 18, are a pair of lenses 26, 28, respectively, for impinging light 24 uniformly onto transparency 14. Intermediate transparency 14 and screen 22, and also centered on projection axis 18, is a projection lens 20. Lens 30 is selected to have a predetermined, inherent f-number, typically in the range of f/2.8. Lens 30 is situated in a support 32, the support being movable along projection axis 18 as indicated by arrow A.

Situated in projector 10 proximate transparency 14 is a ranging mechanism 34. Ranging mechanism 34 includes means for measuring the distance $D_1$ to screen 22, and means for measuring the distance $D_2$ between the center of lens 30 and the center of transparency 14. Ranging mechanism 34 is connected to a focusing mechanism 36, the focusing mechanism in turn being connected to support 32 for translating the support, with lens 30, linearly along axis 18. Ranging mechanism 34 and lens position mechanism 36 together comprise an autofocus apparatus 37, an example of which is shown and described in U.S. Pat. No. 3,628,857 to Harvey, cited above. This U.S. patent is incorporated herein by reference.

In operation, lamp 20 is activated to project light 24 generally along projection axis 18 towards screen 22. Lenses 26, 28 function to impinge light 24 substantially uniformly onto transparency 14, and lens 30 functions to image the transparency into focus on screen 22.

Ranging mechanism 34 functions to measure the distance $D_1$ to screen 22, and the distance $D_2$ between the center of transparency 14 and projection lens 30. Ranging mechanism 34 subsequently directs focusing mechanism 36 to set distance $D_2$ such that the center of transparency 14 is the focus on screen 22 at distance $D_1$. If pop distance P varies as transparency 14 continues to buckle or pop due to the heat generated by lamp 20, ranging mechanism 34 and focusing mechanism 36 operate to correspondingly adjust $D_2$ so as to maintain the center of transparency 14 in focus on screen 22.

A disadvantage of the prior-art transparency projector shown and described with respect to FIG. 1 is that, due to the buckling and popping of transparency 14 in the manner described above, the edges of the projection of the transparency onto screen 22 are out of focus. For purposes of illustration, the projection of transparency 14 onto screen 22 is shown in dashed-line at 40. The thickness T of projection 40 is representative of the depth of field of the projection, depth of field being calculated by the equation:

$$d = 1/F \times D_1 \times K \qquad \text{eq1}$$

where d = depth of field, F = the inherent f-stop of projection lens 30, $D_1$ is the distance between projection lens 30 and screen 22 as described above, and K is a constant which is determined as a function of objectively acceptable quality as related to the size of the circle of confusion. The distance to the focused image, indicated as $D_1$ at the center of the projection 40, is determined by the equation:

$$1/f.1. = 1/D_1 + 1/D_2 \qquad \text{eq2}$$

where f.1 is the focal length of lnes 30, and, consistent with the explanation above, $D_1$ is the distance between lens 30 and the in-focus center of projection 40, and $D_2$ is the distance between lens 30 and the focused region (i.e. the center) of transparency 14.

As is is shown in FIG. 1, the in-focus or sharp field of projection 40 varies as a function of $D_2$. Because the pop distance P of transparency 14 decreases towards the edges of the transparency, thereby causing $D_2$ to decrease towards the edges of the transparency, the distance $D_1$ at which projection 40 is in focus decreases at the projection edges indicated generally at 40B, 40C. This causes the "C" shaped curve of projection 40. As is further shown in FIG. 1, the depth of field of projection 40 is sufficient such that the center portion thereof, indicated generally at 40A, is in focus on screen 22. However, the typically large f-stop of projection lens 30 results in the edge portions of projection 40, 40B and 40C, being out of focus on screen 22.

Figure 2:
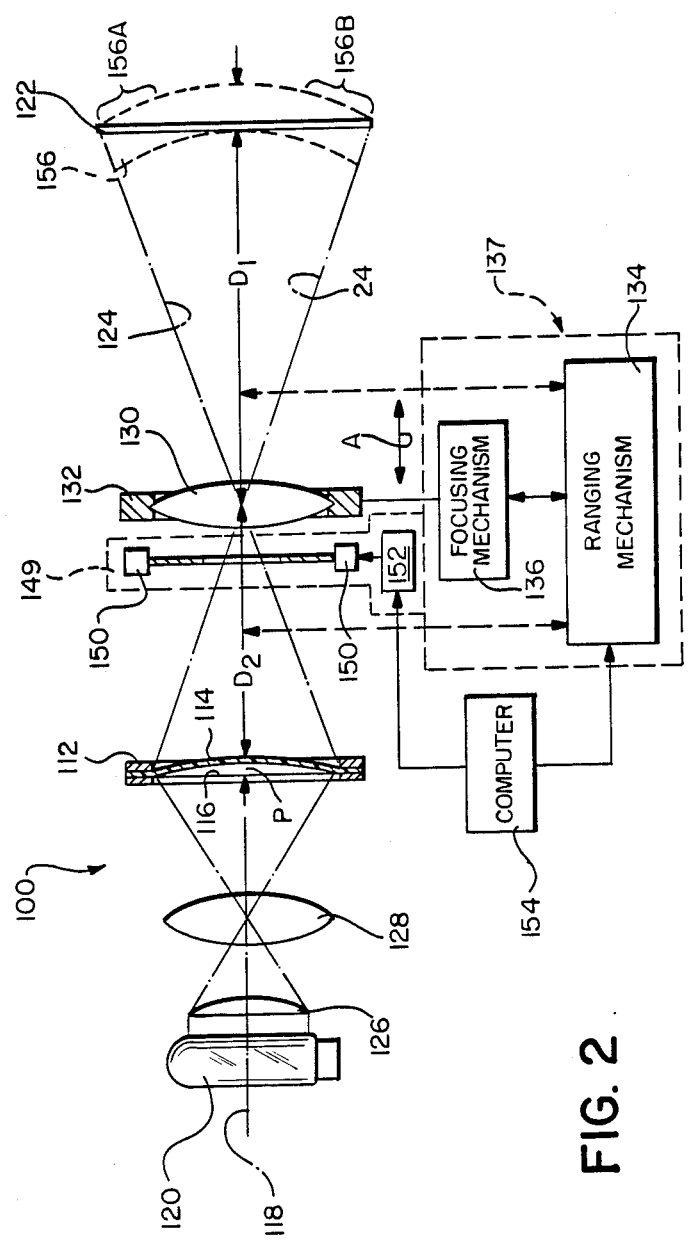
FIG. 2 is a diagrammatic view of a projector constructed in accordance with the present invention.

Referring now to FIG. 2, a projector 100 is shown constructed in accordance with the present invention. Elements identical to those described in FIG. 1 above are represented by like reference numerals incremented by 100, while like distances are represented by the same indicators.

As shown in FIG. 1, projector 100 is identical to projector 10 (FIG. 1) with the addition of a variable aperture means 149 including a variable aperture 150 and aperture controller 152, and a digital computer 154. Variable aperture 150 is disposed intermediate transparency 114 and projection lens 130 for varying the effective F-stop of the projection lens. Computer 154 is connected both to ranging mechanism 134, and to aperture controller 152. Aperture controller 152 is in turn connected to variable aperture 150. Variable aperture 150 and associated controller 152 comprise commercially available equipment, often available as a simple package, many suitable units of which will be well known to those skilled in the art. Computer 154 comprises, for example, a digital microprocessor unit.

In operation, transparency 114 is loaded into gate 112 and projected by lens 130 onto screen 122 so as to form an image 156 (shown in dashed-line) thereat. When first inserted into projection gate 112, transparency 114 is in a relatively cool, flat state, and therefor substantially planar in plane 116. The initial projection is thus made with variable aperture 150 at its widest opening, the effective F-number of lens 130 comprising its own inherent F-number, thereby maximizing the brightness of projection 156.

Computer 154 monitors the operation of ranging mechanism 134 to determine distance $D_2$ immediately after transparency 114 is loaded into holder 112, and continuously thereafter to determine any change in the distance. As described above, the heat from projection lamp 120 is likely to cause transparency 114 to assume a popped or buckled state in a relatively short period of time. If and when computer 154 detects a change in distance $D_2$ as measured by ranging mechanism 134, it calculates the magnitude of that change as pop distance P. After computer 154 determines the magnitude of pop distance P, it uses the equations eq(1 and 2) set out above to determine if transparency 156 will be in focus on screen 122. If computer 154 determines that the edge portions of projection 156, shown at 156A and 156B, will be out of focus, aperture controller 152 is activated to stop down variable aperture 150. In accordance with equation eq(1) above, variable aperture 150 is used to decrease the effective f-stop of projection lens 130 whereby to increase the depth of field T of projection 156 such that the edge portions of the projection are in focus on screen 122. It will be appreciated that variable aperture means 149 operates synergistically with autofocus apparatus 137, the autofocus apparatus operating to maintain the center of transparency 114 in good focus. Further, the output of ranging mechanism 134 is used by computer 154 to determine pop distance P.

It has been determined by the present inventor that, under most projection conditions and using most commercially available projectors, a decrease of one stop in the effective F-number of projection lens 130 will increase the depth of field T of projection 156 by approximately 40%, while having little significant effect on the perceived projection brightness. Decreasing the effective F-number of projection lens 130 by 2 stops will double the depth of field, and while exhibiting a noticeable decrease in brightness, provides a focused image much preferable for viewing in comparison to the blurred image projected with no aperture reduction.

There is thus provided a slide projector, and a method for focusing a slide projector, which projects popped, buckled, or otherwise heat-warped transparencies in good focus. The apparatus and method is straight-forward and economical to implement in current, commercially available projectors.

While a preferred embodiment of the invention has been shown and described, it will be clear that the invention is not so limited. For example, while a projector has been shown in which the projection lens is moved to focus the transparency, the invention is equally applicable to projectors wherein the transparency is moved. Further, while the invention has been described in combination with an auto-focus mechanism for determining the distance from the projection lens to the screen, it is equally applicable to projectors wherein no such feature is provided, and wherein, for example, a human operator is used to initially focus the projection lens. Numerous modifications, changes, variations, substitutions, and equivalents will occur to those skilled in the art without departing from the spirit and scope of the present invention.

What is claimed is:

1. A projector comprising:
    means for supporting a transparency generally in a plane, said transparency typically exhibiting warpage such that the center of said transparency is displaced from said plane by a pop distance;
    means for measuring said pop distance;
    means for projecting light through said transparency;
    means including a lens having a preselected f-number for focusing the light projected through said transparency onto a viewing plane; and
    means responsive to said pop distance for varying the f-number of said lens so as to improve the focus of said transparency at said viewing plane.

2. The projector of claim 1 wherein said f-number varying means comprises a variable aperture disposed between said transparency and said lens.

3. The projector of claim 2 wherein said f-number varying means operates to increase said f-number when said transparency exhibits warpage.

4. The projector of claim 1 and further including autofocus means for measuring the distance to said viewing plane and automatically adjusting said focusing means such that the center of said transparency is in focus.

5. The projector of claim 1 wherein said projecting means comprises:
    a lamp for radiating light; and
    lens means for directing the light radiated by said lamp onto said transparency.

6. The projector of claim 1 wherein said measuring means comprises:
    means for impinging a beam of radiation at a predetermined angle onto the center of said transparency; and
    means for determining the angle at which said beam of radiation is reflected from said transparency.

7. The projector of claim 1 and further including a digital computer connected to said measuring means and said f-number varying means, said computer being responsive to said pop distance for appropriately adjusting said f-number varying means.

8. A projector comprising:
    means for supporting a transparency generally in a plane, said transparency typically exhibiting warpage such that the center of said transparency is displaced from said plane by a pop distance;
    means for impinging a beam of radiation at a predetermined angle onto the center of said transparency; and
    means for determining the angle at which said beam of radiation is reflected from said transparency so as to determine said pop distance;
    means including a lamp for projecting light through said transparency;
    means including a lens having a preselected f-number for focusing the light projected through said transparency onto a viewing plane;
    a variable aperture disposed between said transparency and said lens for varying the effective f-number of said lens; and
    a digital computer connected to said variable aperture, said digital computer responsive to said pop distance so as to adjust said variable aperture to increase the effective f-number of said lens when said transparency exhibits warpage.

9. A method of focusing a projector; said projector comprising means for supporting a transparency generally in a plane, said transparency typically exhibiting a warpage such that the center of said transparency is displaced from said plane by a pop distance, said projector further comprising means for projecting light through said transparency, and means, including a lens having a preselected f-number, for focusing the light projected through said transparency onto a viewing plane, said method comprising the steps of:
    measuring said pop distance; and
    varying, responsive to said pop distance, the f-number of said lens so as to improve the focus of said transparency at said viewing plane.

10. The method of claim 9 wherein said varying step comprises increasing said f-number in response to warpage of said transparency.

11. The method of claim 9 wherein said measuring step comprises the steps of:
    impinging a beam of radiation on the center of said transparency at a predetermined angle; and
    sensing the angle at which said beam of radiation is reflected from said transparency.

12. The method of claim 9 wherein said projector further comprises a variable aperture disposed between said projecting means and said lens, and wherein said varying step is performed by varying said aperture.

* * * * *